United States Patent
Liu et al.

(10) Patent No.: US 11,972,571 B2
(45) Date of Patent: Apr. 30, 2024

(54) METHOD FOR IMAGE SEGMENTATION, METHOD FOR TRAINING IMAGE SEGMENTATION MODEL

(71) Applicant: Infervision Medical Technology Co., Ltd., Beijing (CN)

(72) Inventors: Enyou Liu, Beijing (CN); Shaokang Wang, Beijing (CN); Kuan Chen, Beijing (CN)

(73) Assignee: Infervision Medical Technology Co., Ltd., Beijing (CN)

( * ) Notice: Subject to any disclaimer, the term of this patent is extended or adjusted under 35 U.S.C. 154(b) by 416 days.

(21) Appl. No.: 17/497,954

(22) Filed: Oct. 10, 2021

(65) Prior Publication Data

US 2022/0036561 A1     Feb. 3, 2022

Related U.S. Application Data

(63) Continuation of application No. PCT/CN2021/088407, filed on Apr. 20, 2021.

(30) Foreign Application Priority Data

Jul. 30, 2020  (CN) .......................... 202010752149.0

(51) Int. Cl.
  *G06T 7/11* (2017.01)
  *G06F 18/21* (2023.01)
  (Continued)

(52) U.S. Cl.
  CPC .............. *G06T 7/11* (2017.01); *G06F 18/213* (2023.01); *G06F 18/217* (2023.01);
  (Continued)

(58) Field of Classification Search
  CPC ... G06T 7/11; G06T 5/70; G06T 7/187; G06T 7/194; G06T 2207/20081;
  (Continued)

(56) References Cited

U.S. PATENT DOCUMENTS

| 6,843,638 B2 * | 1/2005 | Hidalgo ................ F01D 17/162 |
| | | 415/189 |
| 2011/0135175 A1 * | 6/2011 | Ostrovsky-Berman ..................... |
| | | G16H 30/40 |
| | | 382/128 |

(Continued)

FOREIGN PATENT DOCUMENTS

| CN | 109785337 A | 5/2019 |
| CN | 109919012 A | 6/2019 |

(Continued)

OTHER PUBLICATIONS

Kitamura et al., Data-Dependent Higher-Order Clique Selection for Artery-Vein Segmentation by Energy Minimization, Arxiv.org, Cornell University Library, vol. 117, No. 2, pp. 142-158, dated Sep. 14, 2015.

(Continued)

*Primary Examiner* — Brandon J Miller
(74) *Attorney, Agent, or Firm* — Westbridge IP LLC

(57) ABSTRACT

The method for image segmentation includes: acquiring, according to an image to be segmented including a background, a mediastinum, an artery and a vein, a first segmentation result of the mediastinum, the artery, the vein and the background in a mediastinum region of the image to be segmented; acquiring, according to the image to be segmented, a second segmentation result of a blood vessel and the background in an epitaxial region of the image to be segmented; and acquiring, according to the first segmentation result and the second segmentation result, a segmentation result of the mediastinum, the artery, the vein and the background of the image to be segmented, so that the segmentation accuracy and the segmentation efficiency of the artery and the vein may be improved.

20 Claims, 8 Drawing Sheets

(51) Int. Cl.
*G06F 18/213* (2023.01)
*G06F 18/25* (2023.01)
*G06N 3/045* (2023.01)
*G06T 5/70* (2024.01)
*G06T 7/187* (2017.01)
*G06T 7/194* (2017.01)

(52) U.S. Cl.
CPC ........... *G06F 18/253* (2023.01); *G06N 3/045* (2023.01); *G06T 5/70* (2024.01); *G06T 7/187* (2017.01); *G06T 7/194* (2017.01); *G06T 2207/20021* (2013.01); *G06T 2207/20081* (2013.01); *G06T 2207/20084* (2013.01); *G06T 2207/20212* (2013.01); *G06T 2207/30101* (2013.01); *G06V 2201/03* (2022.01)

(58) Field of Classification Search
CPC . G06T 2207/20084; G06T 2207/20212; G06T 2207/30101; G06T 2207/10081; G06T 2207/10088; G06T 2207/10124; G06T 2204/20221; G06T 2207/30061; G06T 7/0012; G06T 2207/30; G06F 18/213; G06F 18/217; G06F 18/253; G06N 3/045; G06N 3/084; G06N 3/08; G06V 2201/03
See application file for complete search history.

(56) References Cited

U.S. PATENT DOCUMENTS

| | | | | |
|---|---|---|---|---|
| 2018/0225884 | A1* | 8/2018 | Yamada | G06T 7/149 |
| 2019/0046127 | A1* | 2/2019 | Furukawa | A61B 6/032 |

FOREIGN PATENT DOCUMENTS

| | | |
|---|---|---|
| CN | 109934816 A | 6/2019 |
| CN | 109949322 A | 6/2019 |
| CN | 110428004 A | 11/2019 |
| CN | 110443280 A | 11/2019 |
| CN | 110516535 A | 11/2019 |
| CN | 110546685 A | 12/2019 |
| CN | 110648350 A | 1/2020 |
| CN | 110807764 A | 2/2020 |
| CN | 111000563 A | 4/2020 |
| CN | 111091573 A | 5/2020 |
| CN | 111325759 A | 6/2020 |
| CN | 111462086 A | 7/2020 |
| CN | 111899245 A | 11/2020 |

OTHER PUBLICATIONS

Nardelli et al., Pulmonary Artery-Vein Classification in CT Images Using Deep Learning, IEEE Transactions on Medical Imaging, vol. 37, No. 11, pp. 2428-2440, dated Nov. 1, 2018.
Partial Supplementary European Search Report issued in counterpart European Patent Application No. 21782431.7, dated Jul. 13, 2022.
Pu et al., Automated identification of pulmonary arteries and veins depicted in non-contrast chest CT scans, Medical Image Analysis, vol. 77, dated Jan. 12, 2022.
First Office Action issued in counterpart Chinese Patent Application No. 202010752149.0, dated Dec. 23, 2020.
International Search Report issued in corresponding PCT Application No. PCT/CN2021/088407, dated Jul. 9, 2021.
Notification to Grant Patent Right for Invention issued in counterpart Chinese Patent Application No. 202010752149.0, dated Feb. 7, 2021.

* cited by examiner

Determining a sample image, and the sample image including a first label of a mediastinum, a background, an artery and a vein in a mediastinum region, and a second label of a background and a blood vessel in an epitaxial region — S510

Training a neural network based on the sample image to generate a network model for obtaining a first segmentation result of the mediastinum, the background, the artery and the vein in the mediastinum region, and the neural network being a 3D neural network — S520

Training a cascaded neural network based on the sample image to generate a segmentation model for obtaining a second segmentation result of the background and the blood vessel in the epitaxial region, and the cascaded neural network including a first neural network for feature extraction and a second neural network for generating the second segmentation result — S530

FIG. 5

METHOD FOR IMAGE SEGMENTATION, METHOD FOR TRAINING IMAGE SEGMENTATION MODEL

CROSS-REFERENCE TO RELATED APPLICATIONS

This application is a continuation application of International Application No. PCT/CN2021/088407 filed on Apr. 20, 2021, which claims priority to Chinese patent application No. 202010752149.0, filed on Jul. 30, 2020. Both applications are incorporated herein by reference in their entireties.

TECHNICAL FIELD

The application relates to the field of image processing technologies, and in particular to a method for image segmentation, and a method for training an image segmentation model.

BACKGROUND

Image segmentation is very useful in an imaging diagnosis. For example, dividing pulmonary blood vessels into arteries/veins may help a doctor accurately diagnose a pulmonary disease that may affect an artery or vein tree in a specific way.

SUMMARY

In view of this, a method for image segmentation, and a method for training an image segmentation model are provided in the embodiments of the present application to improve the segmentation accuracy and the segmentation efficiency of an artery and a vein.

According to a first aspect of the embodiments of the present application, a method for image segmentation is provided. The method may include: acquiring, according to an image to be segmented including a background, a mediastinum, an artery and a vein, a first segmentation result of the mediastinum, the artery, the vein and the background in a mediastinum region of the image to be segmented; acquiring, according to the image to be segmented, a second segmentation result of a blood vessel and the background in an epitaxial region of the image to be segmented; and acquiring, according to the first segmentation result and the second segmentation result, a segmentation result of the mediastinum, the artery, the vein and the background of the image to be segmented.

According to a second aspect of the embodiments of the present application, a method for training an image segmentation model is provided. The method may include: determining a sample image, and the sample image including a first label of a mediastinum, a background, an artery and a vein in a mediastinum region, and a second label of a background and a blood vessel in an epitaxial region; training a neural network based on the sample image to generate a network model for obtaining a first segmentation result of the mediastinum, the background, the artery and the vein in the mediastinum region, and the neural network being a 3D neural network; and training a cascaded neural network based on the sample image to generate a segmentation model for obtaining a second segmentation result of the background and the blood vessel in the epitaxial region, and the cascaded neural network including a first neural network for feature extraction and a second neural network for generating the second segmentation result.

According to a third aspect of the embodiments of the present application, a device for image segmentation is provided. The device may include: a first segmentation module, configured to acquire, according to an image to be segmented including a background, a mediastinum, an artery and a vein, a first segmentation result of the mediastinum, the artery, the vein and the background in a mediastinum region of the image to be segmented; a second segmentation module, configured to acquire, according to the image to be segmented, a second segmentation result of a blood vessel and the background in an epitaxial region of the image to be segmented; and an acquisition module, configured to acquire, according to the first segmentation result and the second segmentation result, a segmentation result of the mediastinum, the artery, the vein and the background of the image to be segmented.

According to a fourth aspect of the embodiments of the present application, a device for training an image segmentation model is provided. The device may include: a determination module, configured to determine a sample image, and the sample image including a first label of a mediastinum, a background, an artery and a vein in a mediastinum region, and a second label of a background and a blood vessel in an epitaxial region; a first training module, configured to train a neural network based on the sample image to generate a network model for obtaining a first segmentation result of the mediastinum, the background, the artery and the vein in the mediastinum region, and the neural network being a 3D neural network; and a second training module, configured to train a cascaded neural network based on the sample image to generate a segmentation model for obtaining a second segmentation result of the background and the blood vessel in the epitaxial region, and the cascaded neural network including a first neural network for feature extraction and a second neural network for generating the second segmentation result.

According to a fifth aspect of the embodiments of the present application, an electronic apparatus is provided. The electronic apparatus may include: a processor; a memory configured to store executable instructions of the processor; and the processor is configured to perform a method for image segmentation described in any one of the above embodiments, and/or configured to perform a method for training an image segmentation model described in any one of the above embodiments.

According to a sixth aspect of the embodiments of the present application, a computer readable storage medium is provided. Computer programs are stored on the storage medium, and the computer programs are configured to perform a method for image segmentation described in any one of the above embodiments, and/or configured to perform a method for training an image segmentation model described in any one of the above embodiments.

In the method for image segmentation according to the embodiments of the present application, by separating a blood vessel segmentation task in the mediastinum region from a blood vessel segmentation task in the epitaxial region, a first segmentation result of the mediastinum, the artery, the vein and the background in the mediastinum region and a second segmentation result of the blood vessel and the background in the epitaxial region are obtained, and then the segmentation result of the mediastinum, the artery, the vein and the background of the image to be segmented is obtained according to the first segmentation result and the second segmentation result, which can avoid a segmentation of blood vessels of different sizes affected by a size inconsistency between the blood vessel in the epitaxial region and the blood vessel in the mediastinum region when the artery, the vein and the background are segmented directly, thereby improving the segmentation accuracy and the segmentation efficiency of the artery and the vein.

BRIEF DESCRIPTION OF DRAWINGS

These and other purposes, features, and advantages of the present application may become more apparent by a more detailed description of the embodiments of the present application in conjunction with the drawings. The drawings are used to provide further understanding of the embodiments of the present application and form part of the specification. The drawings are used together with the embodiments of the present application to explain the present application, and do not constitute a limitation on the present application. In the drawings, the same reference label usually represents the same component or step.

FIG. 5 is a flow schematic diagram of a method for training an image segmentation model according to an embodiment of the present application.

DETAILED DESCRIPTION OF THE EMBODIMENTS

Figure 1:
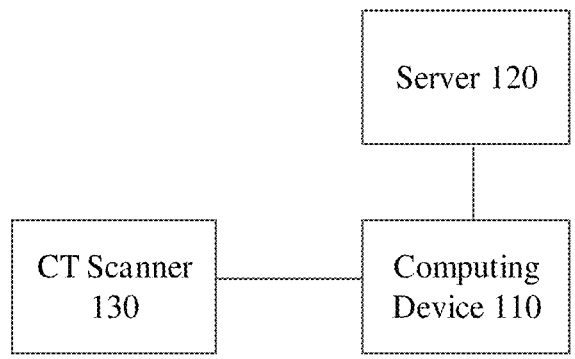
FIG. 1 is a schematic diagram of an implementation environment according to an embodiment of the present application.

A clear and complete description of the technical solution of the embodiments of the present application may be given below in combination with the drawings in the embodiments of the present application. Obviously, the embodiments described are only part of the embodiments of the present application and not all of the embodiments. On the basis of the embodiments in the present application, all other embodiments obtained by the person having ordinary skills in the art without performing creative labor shall be within the protection scope of the present application.

Overview

A deep learning realizes artificial intelligence in a computing system by establishing an artificial neural network with a hierarchical structure. Since the artificial neural network with the hierarchical structure can extract and filter input information layer by layer, the deep learning has an ability of representing learning, and may realize an end-to-end supervised learning and an unsupervised learning. The artificial neural network with the hierarchical structure used by the deep learning has many forms, and the hierarchical complexity in which is usually known as "depth". According to the type of the construction, the forms of the deep learning may include a multi-layer perceptron, a convolutional neural network, a cyclic neural network, a deep confidence network and other hybrid constructions. The deep learning uses data to update parameters in the construction to achieve a training goal, and the process is usually known as "learning". The deep learning provides a method for a computer to learn pattern features automatically, and integrates the feature learning into a process of modelling, thus reducing the incompleteness caused by artificial design features.

A neural network is an operation model, which is composed of a large number of nodes (or neurons) connected to each other. Each node corresponds to a strategy function, and a connection between each two nodes represents a weighted value for passing through a connection signal, which is called weight. The neural network generally includes multiple neural network layers, and the upper and lower network layers are cascaded with each other. An output of the i-th neural network layer is connected to an input of the (i+1)th neural network layer, and an output of the (i+1)th neural network layer is connected to an input of the i+2th neural network layer, and so on. After a training sample is input into a cascaded neural network layer, an output result is output through each neural network layer, and the output result serves as an input of the next neural network layer. Therefore, an output is obtained by calculating through multiple neural network layers, and a predicted result output by the output layer and a real target result are compared, and then a weight matrix and a strategy function of each layer may be adjusted according to the difference between the predicted result and the target result. The neural network uses the training samples to continuously perform the above adjustment process, to adjust the neural network parameters such as weight until the prediction result output by the neural network matches the real target result, and this process is called a training process of the neural network. A neural network model may be obtained after the neural network has been trained.

Recent studies have shown that the pulmonary embolism may be better assessed by classifying the artery/vein, and changes in the artery tree are associated with the development of chronic thromboembolic pulmonary hypertension. Furthermore, changes in the pulmonary parenchymal artery are associated with right ventricular dysfunction. In order to detect changes in two vascular trees, doctors may manually analyze chest CT images of a patient to look for abnormalities. This process is time-consuming, difficult to standardize, and therefore not suitable for large clinical studies or clinical decision-makings in the real-world. Therefore, the automatic separation of the artery and vein in CT images has become a focus of attention for people, which may help the doctors accurately diagnose lesions.

The existing blood vessel segmentation solutions are mainly divided into blood vessel segmentation based on deep learning and blood vessel segmentation based on traditional learning. In particular, for the task of pulmonary blood vessel segmentation, most of the existing blood vessel segmentation solutions are calculated by using a differentiation of blood vessels on the HU value. The result of this solution may be acceptable on CT images without lesions, but, once on CT images having pneumonia and nodules or tumors, the lesions similar to the HU value of the blood vessel may be segmented out. Therefore, the robustness of this solution is difficult to match the requirements of the existing product usage scenarios.

For the blood vessel segmentation solutions based on deep learning, using some improvements based on graph structure is the current mainstream direction, and such improvements include using graph convolution and graph cutting. However, this improved algorithm is difficult to meet the requirement of the real-time and resource scheduling of online products in terms of predicting speed and resource occupancy such as video memory or memory.

After the basic principles of the present application are described, the various non-restrictive embodiments of the present application may be described in detail below with reference to the drawings.

Exemplary System

FIG. 1 is a schematic diagram of an implementation environment according to an embodiment of the present application. The implementation environment includes a CT scanner 130, a server 120 and a computer device 110. The computer device 110 may acquire pulmonary medical images from the CT scanner 130. At the same time, the computer device 110 may also be connected to the server 120 through a communication network. Optionally, the communication network is a wire network or a wireless network.

The CT scanner 130 is configured to perform an X-ray scanning on human tissues to obtain CT images of the human tissues. In an embodiment, a lung may be scanned by the CT scanner 130 to obtain the pulmonary medical images.

The computer device 110 may be a general-purpose computer or a computer device composed of dedicated integrated circuits, which is not limited in the embodiments of the present application. For example, the computer device 110 may be a mobile terminal device such as a tablet computer, or may also be a Personal Computer (PC), such as a laptop computer, a desktop computer, and so on. Those skilled in the art may know that the number of the computer device 110 above-mentioned may be one or more, and the types of which may be the same or different. For example, the computer device 110 above-mentioned may be one, or the computer device 110 above-mentioned may be dozens or hundreds, or more. The number and device type of the computer device 110 are not limited in the embodiments of the present application. The computer device 110 may be deployed with a network model and a segmentation model. The network model is used to segment a mediastinum, an artery, a vein, and a background in a mediastinum region of a pulmonary medical image to obtain a first segmentation result, and the segmentation model is used to segment a blood vessel and a background in an epitaxial region of the pulmonary medical image to obtain a second segmentation result. The computer device 110 may use the network model and the segmentation model deployed on it to perform an image segmentation on the pulmonary medical image obtained from the CT scanner 130, to obtain the first segmentation result and the second segmentation result, and then obtain a segmentation result of the mediastinum, the artery, the vein and the background of the pulmonary medical image. Thus, by separating a blood vessel segmentation task in the mediastinum region from a blood vessel segmentation task in the epitaxial region, it can avoid a segmentation of blood vessels of different sizes affected by a size inconsistency between the blood vessel in the epitaxial region and the blood vessel in the mediastinum region when the artery, the vein and the background are segmented directly, thereby improving the segmentation accuracy and the segmentation efficiency of the artery and the vein.

The server 120 is one server, or consists of several servers, or a virtualization platform, or a cloud computing service center. In some optional embodiments, the server 120 receives training images collected by the computer device 110, and trains a neural network through the training images, to obtain a network model for segmenting the mediastinum, the artery, the vein and the background in the mediastinum region of the pulmonary medical image, and a segmentation model for segmenting the blood vessel and the background in the extensional region of the pulmonary medical image. The computer device 110 may send the pulmonary medical image acquired from the CT scanner 130 to the server 120, and the server 120 may use the network model and the segmentation model trained on it to segment the mediastinum, the artery, the vein, and the background in the mediastinum region and the blood vessel and the background in the epitaxial regions of the pulmonary medical image, thus obtaining the segmentation result of the mediastinum, the artery, the vein and the background of the pulmonary medical image. The server 120 sends the segmentation result to the computer device 110 for medical staff to view. Thus, by separating the blood vessel segmentation task in the mediastinum region from the blood vessel segmentation task in the epitaxial region, it can avoid the segmentation of the blood vessels of different sizes affected by the size inconsistency between the blood vessel in the epitaxial region and the blood vessel in the mediastinum region when the artery, the vein and the background are segmented directly, thereby improving the segmentation accuracy and the segmentation efficiency of the artery and the vein.

Exemplary Method

Figure 2:
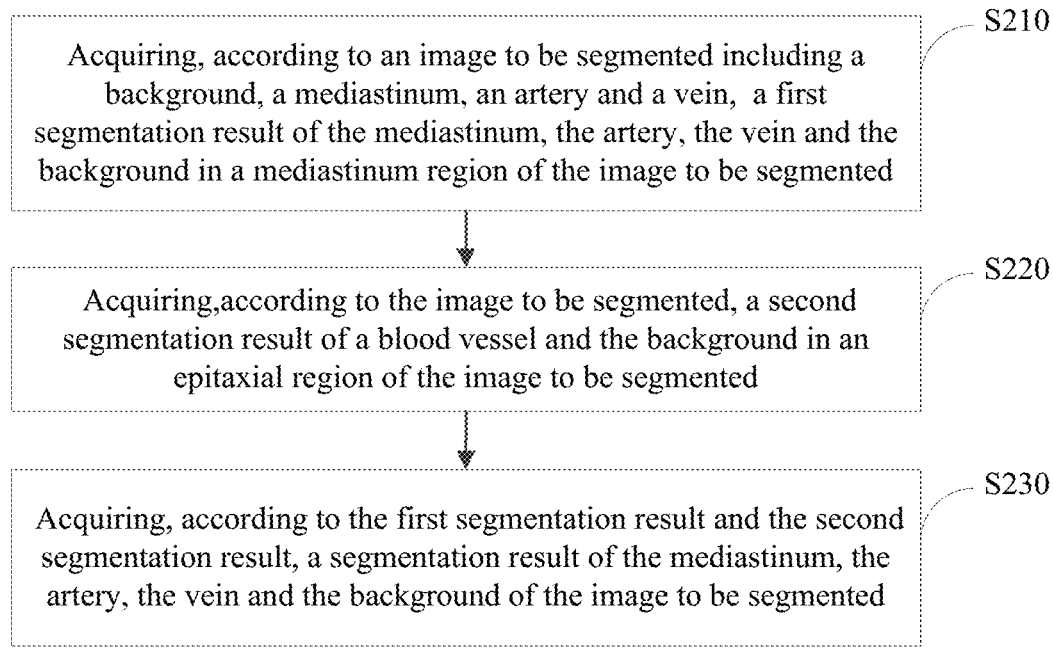
FIG. 2 is a flow schematic diagram of a method for image segmentation according to an embodiment of the present application.

FIG. 2 is a flow schematic diagram of a method for image segmentation according to an embodiment of the present application. The method described in FIG. 2 is performed by a computing device (for example, a server), but the embodiments of the present application are not limited to thereto. The server may be one server, or consists of several servers, or a virtualization platform, or a cloud computing service center, which is not limited in the embodiments of the present application. As shown in FIG. 2, the method includes the following steps.

S210: acquiring, according to an image to be segmented including a background, a mediastinum, an artery and a vein, a first segmentation result of the mediastinum, the artery, the vein and the background in a mediastinum region of the image to be segmented.

The image to be segmented may be a medical image such as a Computed Tomography (CT), a Magnetic Resonance Imaging (MRI), a Computed Radiography (CR), or a Digital Radiography (DR), etc., which is not limited in the embodiments of the present application.

The image to be segmented may be a pulmonary medical image, and this is not specifically limited in the embodiments of the present application. The image to be segmented may also be a medical image of other organs, as long as the medical image may differentiate a larger-sized blood vessel from a smaller-sized blood vessel by means of region division, for example, the mediastinum region and the epitaxial region in the embodiments of the present application. Specific forms of the image to be segmented are also not limited in the embodiments of the present application, and the image to be segmented may be an original medical image, a pre-processed medical image, or a part of the original medical image.

In an embodiment, the mediastinum region refers to a region near the left and right mediastinum pleura, between which there are heart, large blood vessels in and out of the heart, esophagus, trachea, thymus, nerves and lymph tissues, etc.; and the epitaxial region refers to a region containing blood vessels outside the mediastinum region. For example, as for the pulmonary medical image, the mediastinum region refers to a region near the left and right mediastinum pleura, and the epitaxial region refers to an intrapulmonary region other than the mediastinum region. A size of the blood vessel in the mediastinum region is larger than that of the blood vessel in the epitaxial region.

In an embodiment, a first segmentation may be performed on the image to be segmented including the background, the artery, and the vein to obtain the first segmentation result of the mediastinum, the artery, the vein, and the background in the mediastinum region. However, it should be noted that the specific implementation means of the first segmentation are not limited in the embodiments of the present application.

S220: acquiring, according to the image to be segmented, a second segmentation result of a blood vessel and the background in an epitaxial region of the image to be segmented.

In an embodiment, a second segmentation may be performed on the image to be segmented to obtain the second segmentation result of the blood vessel and the background in the epitaxial region. However, it should be noted that the specific implementation means of the second segmentation are not limited in the embodiments of the present application.

Performing the second segmentation on the image to be segmented may separate the blood vessel in the epitaxial region of the image to be segmented from the background in the epitaxial region of the image to be segmented, but not classify the blood vessel, i.e., not distinguish whether the blood vessel is an artery or a vein, as long as the blood vessel and the background are separated.

The embodiments of the present application also do not limit whether the specific implementation means of the first segmentation and the second segmentation are the same, and the two may be the same or different. And the embodiments of the present application do not limit the sequence of performing the first segmentation and the second segmentation. The first segmentation may be performed first, and the second segmentation may be performed first, or the first segmentation and the second segmentation may be performed at the same time, as long as the respective segmentation results can be obtained.

S230: acquiring, according to the first segmentation result and the second segmentation result, a segmentation result of the mediastinum, the artery, the vein and the background of the image to be segmented.

In an embodiment, the first segmentation result and the second segmentation result may be processed to obtain the segmentation result of the mediastinum, the artery, the vein, and the background. However, the embodiments of the present application do not limit how to process the first segmentation result and the second segmentation result, as long as the final segmentation result of the background, the artery and the vein may be obtained.

The first segmentation result refers to a segmentation result in the mediastinum region of the image to be segmented, and the second segmentation result refers to a segmentation result in the epitaxial region of the image to be segmented. For example, the first segmentation result and the second segmentation result may be simply superimposed to obtain the segmentation result of the mediastinum, the artery, the vein, and the background of the image to be segmented; or the first segmentation result and the second segmentation result may be only as an intermediate result, and then the intermediate result is processed to obtain the segmentation result of the mediastinum, the artery, the vein, and the background.

It can be seen that, by separating the blood vessel segmentation task in the mediastinum region from the blood vessel segmentation task in the epitaxial region to obtain a first segmentation result of the mediastinum, the artery, the vein and the background in the mediastinum region, and a second segmentation result of the blood vessel and the background in the epitaxial region, and then the segmentation result of the mediastinum, the artery, the vein and the background of the image to be segmented is obtained according to the first segmentation result and the second segmentation result, which can avoid the segmentation of the blood vessels of different sizes affected by the size inconsistency between the blood vessel in the epitaxial region and the blood vessel in the mediastinum region when the artery, the vein and the background are segmented directly, thereby improving the segmentation accuracy and the segmentation efficiency of the artery and the vein.

Figure 3:
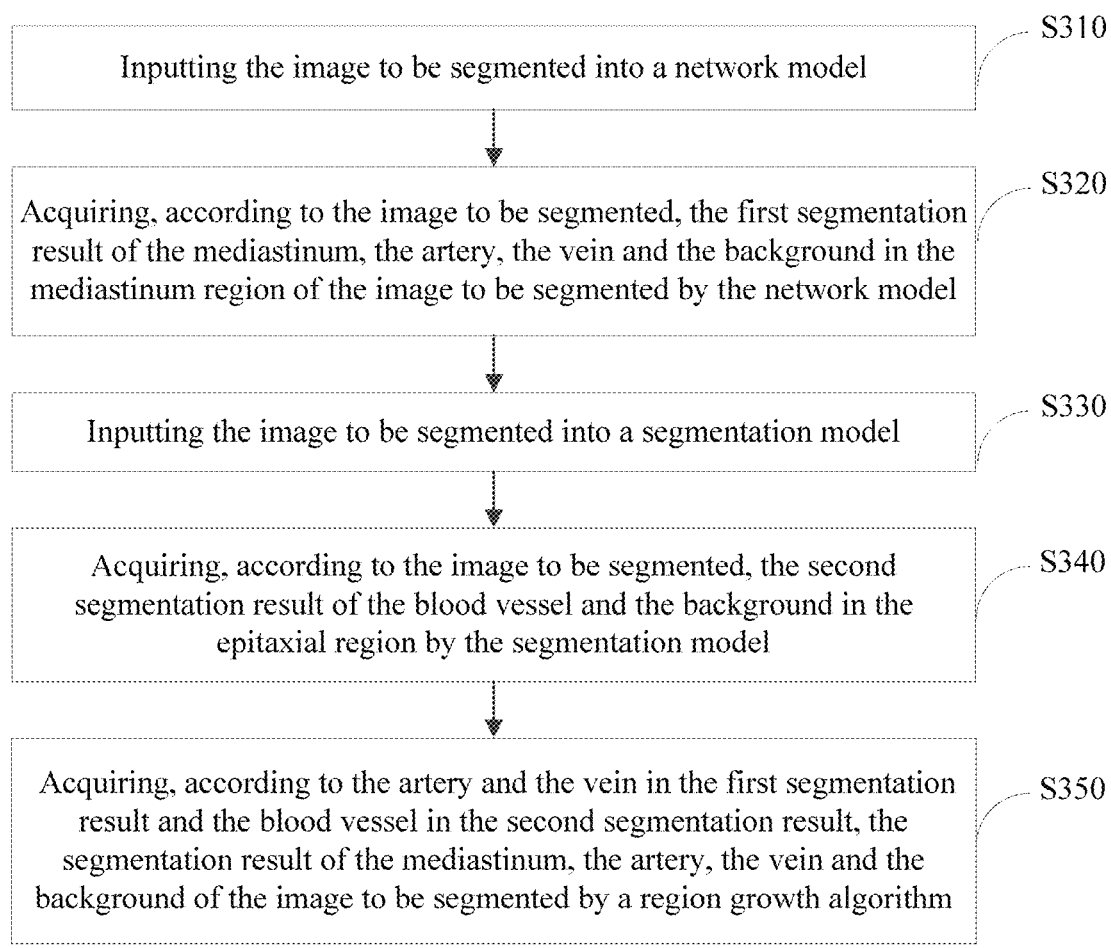
FIG. 3 is a flow schematic diagram of a method for image segmentation according to another embodiment of the present application.

In another embodiment of the present application, a method shown in FIG. 3 is an example of the method shown in FIG. 2, and the method shown in FIG. 3 further includes the following steps.

S310: inputting the image to be segmented into a network model.

In order to perform segmentation on the image to be segmented, the image to be segmented may be input into the network model used to obtain the first segmentation result of the mediastinum, the artery, the vein and the background in the mediastinum region for segmentation.

The specific type of the network model is not limited in the embodiments of the present application, and the network model may be composed of any type of neural networks. Optionally, the network model may be a Convolutional Neural Network (CNN), a Deep Neural Network (DNN), or a Recurrent Neural Network (RNN), etc. The network model may include neural network layers such as an input layer, a convolutional layer, a pooling layer and a connection layer, etc., and this is not specifically limited in the embodiments of the present application. Furthermore, the number of each type of neural network layer is also not limited in the embodiments of the present application.

S320: acquiring, according to the image to be segmented, the first segmentation result of the mediastinum, the artery, the vein and the background in the mediastinum region of the image to be segmented by the network model.

The image to be segmented is directly input into the network model to obtain the first segmentation result of the mediastinum, the artery, the vein and the background in the mediastinum region of the image to be segmented. The first segmentation result of the mediastinum, the artery, the vein, and the background in the mediastinum region of the image to be segmented may be more accurate by inputting the image to be segmented into the network model for segmentation.

In an embodiment, inputting the image to be segmented into a network model includes: performing a dicing operation on the mediastinum region of the image to be segmented to obtain multiple dicing images, and each dicing image of the multiple dicing images including the mediastinum; and inputting the multiple dicing images into the network model. The acquiring, according to the image to be segmented, the first segmentation result of the mediastinum, the artery, the vein and the background in the mediastinum region of the image to be segmented by the network model, includes: acquiring, according to the multiple dicing images, multiple sub-segmentation results of the mediastinum, the artery, the vein and the background in the mediastinum region corresponding to the multiple dicing images by the network model; performing a combination operation on the multiple sub-segmentation results by a Gaussian smoothing process to obtain a combined segmentation result; and performing a post-processing on the combined segmentation result by a connected region algorithm to obtain the first segmentation result.

The network model may be a 3D network model or a 2D network model, which is not specifically limited in the embodiments of the present application, and those skilled in the art may design the specific type of the network model according to actual application requirements.

For example, the 3D network model is widely used in the field of medical image segmentation due to its high accuracy and excellent 3D performance. However, the 3D segmentation network model consumes a large quantity of computing resources. If a complete image to be segmented (i.e., an original medical image) is directly input into the 3D segmentation network model, the video memory required for training the 3D segmentation network model may be very large.

In order to consider both the consumption of the computing resources and the final segmentation accuracy, the mediastinum region of the image to be segmented may be diced. I.e., the image to be segmented corresponding to the mediastinum region is diced to obtain multiple dicing images corresponding to the mediastinum region. The multiple dicing images may overlap each other, and then the multiple dicing images are input into the network model for segmentation. However, it should be noted that, the embodiments of the present application do not limit how many dicing images the image to be segmented is segmented, nor limit a size of a overlapped portion between two adjacent dicing images.

The dicing images contain the mediastinum, which is helpful for judging the category of the blood vessels in the mediastinum region. I.e., the mediastinum may be used as a reference for the 3D network model to learn to classify the artery and the vein, so that the 3D network model may better judge the category of the artery and the vein.

In the multiple dicing images are input into the network model for image segmentation after the multiple dicing images are obtained. In this case, one sub-segmentation result may be output when one dicing image is input into the network model, i.e., one dicing image corresponds to one sub-segmentation result, and multiple dicing images correspond to multiple sub-segmentation results. The multiple sub-segmentation results correspond to the segmentation result of the mediastinum, the artery, the vein and the background in the mediastinum region of the image to be segmented.

In an embodiment, the multiple sub-segmentation results may be combined into a mask equivalent to a size of the image to be segmented, which is used as the first segmentation result. Since the multiple dicing images overlap each other, only a segmentation result of a center position may be retained and the segmentation result of the center position may be combined to ensure the boundary smoothness of the first segmentation result obtained after the combination. I.e., in order to obtain the first segmentation result of the mediastinum, the artery, the vein, and the background in the mediastinum region of the image to be segmented with a smooth boundary, the Gaussian smoothing process may be used to combine the multiple sub-segmentation results, to obtain the first segmentation result of the mediastinum, the artery, the vein, and the background in the mediastinum region with the smooth boundary.

It should be understood that, the simplest combination operation may be to directly splice the multiple dicing images together, which is simple and fast, but may bring a picket fence effect (i.e., since the network model has a poor performance and a poor consistency near the boundary of the dicing images, there may be an obvious combined trace when the segmentation results corresponding to two adjacent dicing images are combined together). Since the segmentation result of the network model at the center position of the dicing image is more reliable and perform better, only the segmentation result of the dicing image near the center position may be remained. For example, the size of the dicing image is 192*192*64, but only a segmentation result of a region with a size of 160*160*48 near the center position may be remained. In order to further alleviate the picket fence effect and make the segmentation result of the network model smoother, a step length of the dicing may be modified on the basis of the combined operation of direct splicing, and mean value of an overlapped region of the segmentation results of the two regions with the size of 160*160*48 may be calculated. But the shortcoming of this combination operation is that the priori assumption mentioned is not used, and therefore, a combination operation adopting the Gaussian smoothing process may be used to overcome this shortcoming, so that the accuracy of the segmentation result is relatively high.

A Gaussian function may be adopted, the center position of the dicing image may be taken as the mean value of the Gaussian kernel, and a method for Gaussian weighting may be used for smoothing, which fits the prior knowledge that the network model has a high confidence coefficient in the center position of the dicing image and better smooths the first segmentation result obtained through the combined operation.

But it should be noted that, the function used in the Gaussian smoothing process is not limited in the embodiments of the present application, the Gaussian function may be adopted, or other bell functions may be adopted.

In an embodiment, in order to remove some extracorporeal false positives and make junctions between the combined dicing images consistent, the post-processing may be performed on the combined segmentation result by the connected region algorithm to obtain the first segmentation result. However, the specific implementation means of the post-processing are not limited in the embodiments of the present application, as long as the points of the false positives and the points with inconsistent performance at the junctions can be removed.

In an embodiment, the performing a post-processing on the combined segmentation result by a connected region algorithm to obtain the first segmentation result includes: acquiring a vein maximum connected region and an artery maximum connected region of the combined segmentation result by the connected region algorithm; and removing, according to the vein maximum connected region and the artery maximum connected region, a noise point in the combined segmentation result to obtain the first segmentation result, and the noise point includes a point that is both on the artery and the vein and a false positive point.

First, a connected region processing may be performed on the combined segmentation result to obtain the maximum connected region, which includes the artery maximum connected region and the vein maximum connected region. Secondly, the artery maximum connected region and the vein maximum connected region in the combined segmentation result may be removed to obtain the noise point in the combined segmentation result. Finally, the first segmentation result may be obtained by removing the noise point from the combined segmentation result. Thus, the first segmentation result may not include a point that does not meet the requirements such as the point that is both on the artery and the vein, or the false positive point.

The noise point may include the point that is both on the artery and the vein and the false positive point, which is not specifically limited in the embodiments of the present application, and the noise point may also be another point that does not meet the requirements.

S330: inputting the image to be segmented into a segmentation model.

In order to segment the image to be segmented, the image to be segmented may be input into the segmentation model for segmentation, and the segmentation model is used to obtain the second segmentation result of the blood vessel and the background in the epitaxial region.

The specific type of the segmentation model is not limited in the embodiments of the present application, and the segmentation model may be composed of any type of neural networks. Optionally, the network model may be a Convolutional Neural Network (CNN), a Deep Neural Network (DNN), or a Recurrent Neural Network (RNN), etc. The network model may include neural network layers such as an input layer, a convolutional layer, a pooling layer, and a connection layer, and this is not limited in the embodiments of the present application. Furthermore, the number of each type of neural network layer is also not limited in the embodiments of the present application.

S340: acquiring, according to the image to be segmented, the second segmentation result of the blood vessel and the background in the epitaxial region by the segmentation model.

The image to be segmented may be input into the segmentation model directly to obtain the second segmentation result of the blood vessel and the background in the epitaxial region of the image to be segmented. The second segmentation result of the blood vessel and the background in the epitaxial region of the image to be segmented may be more accurate by inputting the image to be segmented into the segmentation model for segmentation.

The segmentation model may separate the blood vessel in the epitaxial region of the image to be segmented from the background in the epitaxial region of the image to be segmented, but not classify the blood vessel, i.e., not distinguish whether the blood vessel is an artery or a vein, as long as the blood vessel and the background are separated.

For example, as for the pulmonary medical image, the epitaxial region refers to an intrapulmonary region. Since the blood vessel is easily identified in the intrapulmonary region, some lightweight model structures may be used for the segmentation model. In an embodiment, the segmentation model may be a 2D segmentation model, and this is not specifically limited in the embodiments of the present application. Those skilled in the art may design the specific type of the network model according to actual application requirements. The specific model structure of the segmentation model is also not specifically limited in the embodiments of the present application. Those skilled in the art may design the specific model structure of the segmentation model according to actual application requirements, for example, the segmentation model may be composed of a ResNet18 and a feature pyramid network.

Overall, by segmenting the blood vessel with larger size in the mediastinum region using the network model, and segmenting the blood vessel with smaller size in the epitaxial region using the segmentation model, it is possible to avoid the shortcoming of an unbalance between the segmentation effect and the segmentation performance when only using a single model to segment the blood vessel with larger size and the blood vessel with smaller size.

For example, if a single 3D network model is used to segment the blood vessel in the mediastinum region and the blood vessel in the epitaxial region, there may be relevance between the size of the dicing image including the mediastinum and the classification accuracy of the artery and the vein in the epitaxial region. Specifically, a CT physical resolution (i.e., a pixelspacing resolution) of the dicing image may affect the segmentation of the blood vessel with smaller size in the epitaxial region (i.e., the higher the pixelspacing resolution, the higher proximity it may be to the physical world, and the lower the pixelspacing resolution, the lower proximity it may be to the physical space). I.e., the higher the CT physical resolution of the dicing image, the more helpful the segmentation of the blood vessel with smaller size in the epitaxial region. In theory, the larger the physical volume of the dicing image, the larger the CT physical resolution of the dicing image, and therefore, the better the performance of the 3D network model in segmenting the blood vessel with smaller size and classifying the artery and the vein. However, the physical volume and the CT physical resolution are inversely proportional in the case that the size of the dicing image remains unchanged. The size of the dicing image should be increased if the physical volume and the CT physical resolution need to be improved at the same time, i.e., the accuracy of the 3D network model used for segmentation of the blood vessel with smaller size and classification of the artery and the vein need to be improved. For example, when the physical volume of the dicing image remains unchanged, assuming that the CT physical resolution of the dicing image is scaled by 0.5, then each side of the dicing image may be enlarged by 2 times, so that the size of the dicing image and the size of the 3D network model may be enlarged to 8 times the original size. In other words, if the physical volume of the dicing image is increased, the size of the dicing image needs to increase by more than 8 times, which may obviously increase the video memory required when training the 3D segmentation network model, thus reducing the segmentation efficiency of the 3D network model to the image to be segmented.

Therefore, two models are adopted to perform different segmentations to avoid the above-mentioned contradiction. I.e., the 2D segmentation model is responsible for the segmentation precision of the blood vessel with smaller size in the epitaxial region, and the 3D network model is responsible for the classification accuracy and the segmentation accuracy of the blood vessel with larger size in mediastinum region. Thus, the size of the dicing image may be reduced, i.e., the segmentation task of the 3D network model may be simplified; and the segmentation accuracy and the classification accuracy of the blood vessels in the mediastinum region and near the mediastinum region may also be ensured, i.e., a better segmentation effect and a better classification effect of the blood vessels in the mediastinum region and near the mediastinum region may be obtained only when the physical volume of the dicing image is large enough. For example, if the CT physical resolution is increased by 1.3 times the original, the video memory may be reduced to 2 times the original in the case that the same segmentation effect and the same classification effect of the blood vessels in the mediastinum region and near the mediastinum region are obtained, thereby increasing the segmentation efficiency of the 3D network model to the image to be segmented.

S350: acquiring, according to the artery and the vein in the first segmentation result and the blood vessel in the second segmentation result, the segmentation result of the mediastinum, the artery, the vein and the background of the image to be segmented by a region growth algorithm.

Figure 4:
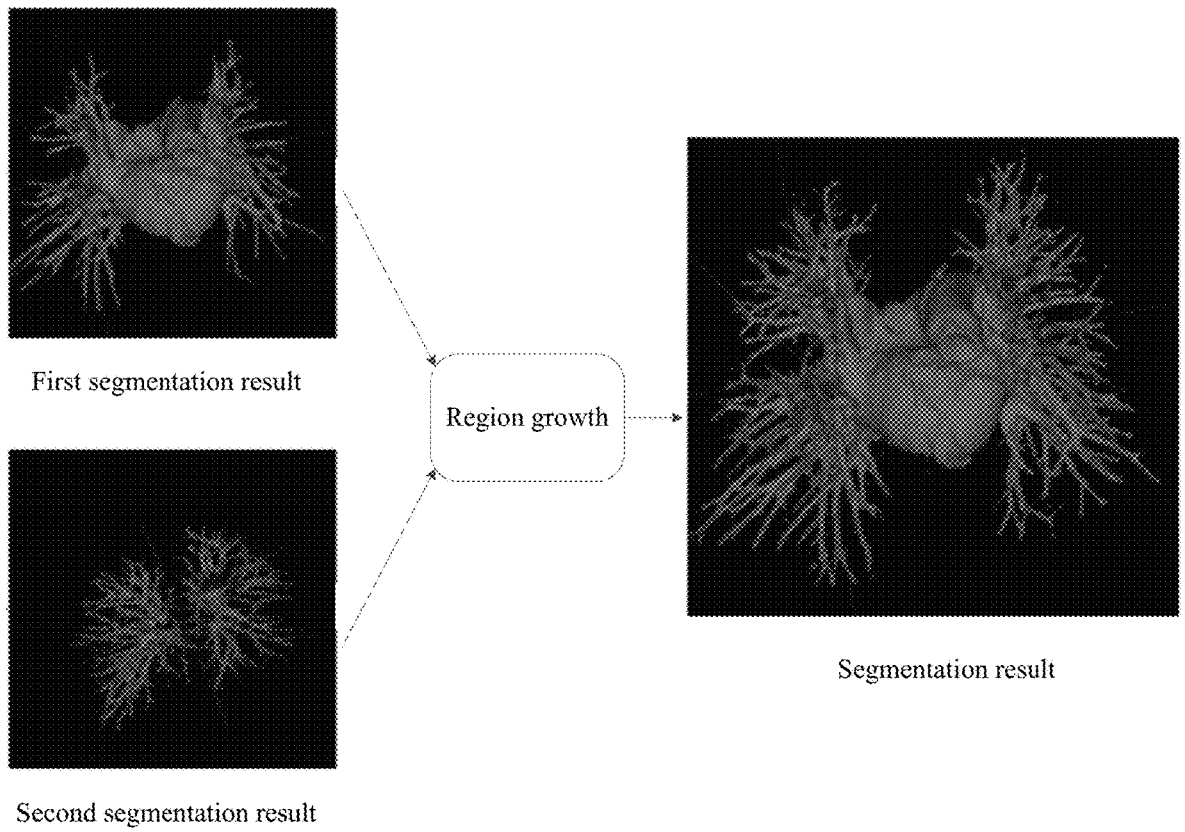
FIG. 4 is a schematic diagram of an implementation process of a region growth according to an embodiment of the present application.

FIG. 4 illustrates an implementation process of a region growth. As shown in FIG. 4, after obtaining the first segmentation result and the second segmentation result, a region growth may be performed on the artery and the vein in the first segmentation result and the blood vessel in the second segmentation result, and the artery and the vein in the first segmentation result and the blood vessel in the second segmentation result may be combined together to obtain the segmentation result of the mediastinum, the artery, the vein and the background of the image to be segmented. Cuda may be used to implement to make the speed of the region growth meet the requirements.

It should be understood that, the region growth algorithm is to group similar pixels to form a final region. First, a seed pixel for each region to be segmented should be found as a starting point for growth, and then pixels having the same or similar properties as the seed pixel (determined according to a predetermined growth criterion or a similarity criterion) in the neighborhood around the seed pixel should be merged into the region where the seed pixel is located. The new pixels are used as the seeds to continue to grow around until no more pixels that meet the conditions can be included, and a final region growth is completed.

In another embodiment of the present application, the acquiring, according to the artery and the vein in the first segmentation result and the blood vessel in the second segmentation result, the segmentation result of the mediastinum, the artery, the vein and the background of the image to be segmented by a region growth algorithm, includes: performing, with the artery and the vein in the first segmentation result as a start point, a region growth on the artery and the vein in the first segmentation result along the blood vessel in the second segmentation result by a preset growth length, to obtain the segmentation result of the mediastinum, the artery, the vein and the background of the image to be segmented.

Since the artery and the vein in the mediastinum region are classified in the first segmentation result, while the artery and the vein in the epitaxial region are not classified in the second segmentation result, and since the blood vessels in the first segmentation result and in the second segmentation result may overlap in the mediastinum region, but may not overlap in the intrapulmonary region, the artery and the vein in the first segmentation result may be used as the starting point of the region growth, and the blood vessel in the second segmentation result may be used as a trajectory of the region growth. The artery and the vein in the first segmentation result may further extend to the epitaxial region along the blood vessel in the second segmentation result, i.e., the artery and the vein in the first segmentation result may grow along the blood vessel in the second segmentation result.

Since the artery and the vein are two complete connected regions, the artery and the vein in the epitaxial region after the region growth may be classified by the analysis of connected region with the determined artery and the determined vein used as the starting point; and since the artery and the vein are two complete connected regions, while the false positives in the second segmentation result may not be combined to these two complete connected regions, the false positives in the second segmentation result may also be removed through the region growth.

Since the region growth algorithm is an iterative algorithm, in each iteration process, it is possible to set the preset growth length of the blood vessel when the artery and the vein in the first segmentation result are performing the region growth along the blood vessel in the second segmentation result (for example, as for the pulmonary medical image, the preset growth length of the blood vessel is a preset intrapulmonary growth length of the blood vessel). In the display of the segmented image, the granularity of the blood vessel may be dynamically displayed by adjusting the preset growth length of the blood vessel during each iteration process, which may avoid the situation that some lesions are shielded by the blood vessel when the medical staff is viewing the VR of the segmented image, thereby increasing the user experience.

However, the specific value of the preset growth length of the blood vessel in each iteration process is not limited in the embodiments of the present application, which may be selected according to different application requirements.

Overall, the segmentation task of the artery and the vein may be disassembled into three subtasks by further extending the artery and the vein in the first segmentation result to the epitaxial region along the blood vessel in the second segmentation result. The complexity of the task may be reduced by using two models to obtain the first segmentation result and the second segmentation result respectively. Then some simple model structures may be used to reduce the video memory and speed up the prediction speed to meet requirements of the real-time and the resource scheduling of online products.

FIG. 5 is a flow schematic diagram of a method for training an image segmentation model according to an embodiment of the present application. The method described in FIG. 5 may be performed by a computing device (for example, a server), but this is not limited in the embodiments of the present application. The server may be one server, or be consist of several servers, or a virtualization platform, or a cloud computing service center, which is not limited in the embodiments of the present application. As shown in FIG. 5, the method includes the following steps.

S510: determining a sample image, and the sample image including a first label of a mediastinum, a background, an artery and a vein in a mediastinum region, and a second label of a background and a blood vessel in an epitaxial region.

The first label refers to a label obtained by labeling the mediastinum, the background, the artery and the vein in the mediastinum region of the sample image; and the second label refers to a label obtained by labeling the background and the blood vessel in the epitaxial region of the sample image, and the artery and the vein are not distinguish in the blood vessel in the second label.

The sample image mentioned in this embodiment is the same type of image as the image to be segmented mentioned in above embodiments. The sample image has been marked manually to obtain the first label and the second label.

However, it should be noted that, the specific form of the sample image is not limited in the embodiments of the present application, which may be an original medical image, a pre-processed medical image, or a part of an original medical image.

The mediastinum region and the epitaxial region mentioned in this embodiment are the same as those in embodiments of the method for image segmentation above-mentioned, and the specific details are not repeated herein, please refer to the embodiments of the method for image segmentation above-mentioned.

S520: training a neural network based on the sample image to generate a network model for obtaining a first segmentation result of the mediastinum, the background, the artery and the vein in the mediastinum region, and the neural network being a 3D neural network.

In an embodiment, the sample image is input into the neural network, and the neural network is trained to generate the network model.

The trained neural network may be any type of neural networks. Optionally, the trained neural network may be a Convolutional Neural Network (CNN), a Deep Neural Network (DNN), or a Recurrent Neural Network (RNN), etc. The specific type of the trained neural network is not limited in the embodiments of the present application. The trained neural network may include neural network layers such as an input layer, a convolutional layer, a pooling layer, and a connection layer, and this is not limited in the embodiments of the present application. Furthermore, the number of each type of neural network layer is also not limited in the embodiments of the present application. Optionally, the trained neural network is a 3D neural network.

S530: training a cascaded neural network based on the sample image to generate a segmentation model for obtaining a second segmentation result of the background and the blood vessel in the epitaxial region, and the cascaded neural network including a first neural network for feature extraction and a second neural network for generating the second segmentation result.

In an embodiment, the sample image is input into the cascaded neural network, and the cascaded neural network is trained to generate the segmentation model.

The first neural network and the second neural network may be any type of neural networks. Optionally, the first neural network and the second neural network may be a Convolutional Neural Network (CNN), a Deep Neural Network (DNN), or a Recurrent Neural Network (RNN), etc. The specific types of the first neural network and the second neural network are not limited in the embodiments of the present application. The first neural network and the second neural network may include neural network layers such as an input layer, a convolutional layer, a pooling layer, and a connection layer, and this is not limited in the embodiments of the present application. Furthermore, the number of each type of neural network layer is also not limited in the embodiments of the present application.

The cascaded neural network may include the first neural network for feature extraction and the second neural network behind the first neural network for generating the second segmentation result. However, the specific structure of the cascaded neural network is not specifically limited in the embodiments of the present application, and the cascaded neural network may also include other neural networks.

The sequence of training the network model and training the segmentation model is not limited in the embodiments of the present application. The network model may be trained first, or the segmentation model may be trained first, or the network model and the segmentation model may be trained at the same time, as long as the trained network model and the trained segmentation model may be obtained.

In another embodiment of the present application, the method further includes: performing a dicing operation on the mediastinum region of the sample image to obtain multiple dicing images, and each dicing image of the multiple dicing images includes the mediastinum. The training a neural network based on the sample image to generate a network model for obtaining a first segmentation result of the mediastinum, the background, the artery and the vein in the mediastinum region, includes: training the neural network based on the multiple dicing images to generate the network model.

The dicing operation mentioned in this embodiment is the same as that in the embodiments of the method for image segmentation above-mentioned, and the specific details are not repeated herein, please refer to the embodiments of the method for image segmentation above-mentioned.

In an embodiment, the multiple dicing images are input into the 3D neural network respectively, and the 3D neural network is trained to generate the network model. However, the training process of the 3D neural network is not limited in the embodiments of the present application, as long as the network model for obtaining the first segmentation result of the mediastinum, the artery, the vein, and the background in the mediastinum region can be formed.

For example, a first loss function may be used to calculate a similarity loss between the first segmentation result corresponding to each dicing image output by the 3D neural network and the first label corresponding to each dicing image (i.e., a target result of the mediastinum, the background, the artery, and the vein), and therefore, a first loss function value of the 3D neural network may be obtained. The smaller the first loss function value, the closer the predicted first segmentation result is to the target result, and the higher the accuracy of the correct prediction. In contrast, the larger the first loss function value, the lower the accuracy of the correct prediction. A backward propagation of gradients may be performed on the first loss function value to update the parameters of the 3D neural network, such as weights, bias values, etc., which is not limited in the present application.

In another embodiment of the present application, the training a cascaded neural network based on the sample image to generate a segmentation model for obtaining a second segmentation result of the background and the blood vessel in the epitaxial region includes: performing a downsampling operation on the sample image by the first neural network to obtain multiple first feature maps; performing an up-sampling operation and a fusion operation on the multiple first feature maps by the second neural network to obtain a second feature map; activating the second feature map by using a classifier to obtain the second segmentation result of the background and the blood vessel in the epitaxial region; obtaining a loss function value of the cascaded neural network according to the second segmentation result and the second label; and updating parameters of the cascaded neural network according to the loss function value. The first neural network is a deep residual network, and the second neural network is a feature pyramid network.

Figure 6:
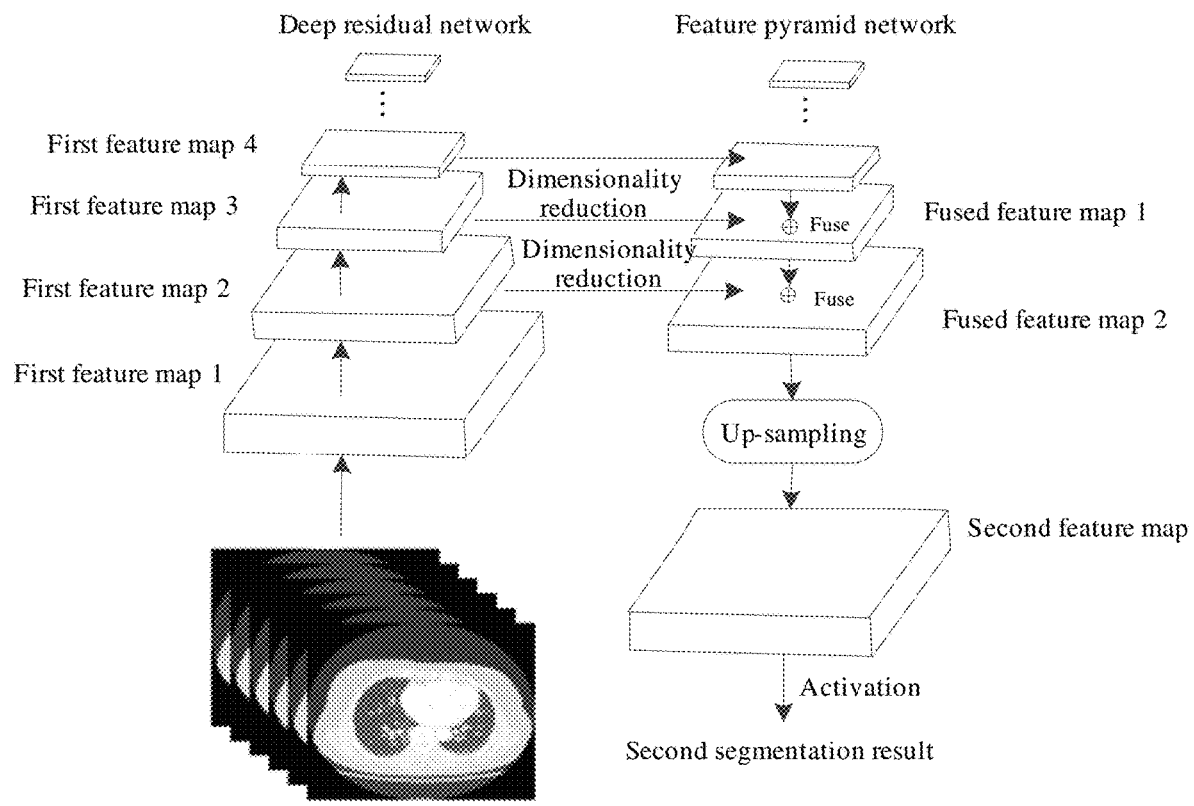
FIG. 6 is a schematic diagram of a training process of a cascaded neural network according to an embodiment of the present application.

FIG. 6 shows an example of a training process of a cascaded neural network, which is specifically as follows.

The sample image is input into the deep residual network, and the down-sampling operation is performed on it to generate multiple first feature maps, i.e., a first feature map 1, a first feature map 2, a first feature map 3 and a first feature map 4. However, the number of the first feature maps is not limited in the embodiments of the present application, and the multiple of the down-sampling is also not limited in the embodiments of the present application.

Then the multiple first feature maps are input into the feature pyramid network respectively, and the up-sampling operation and the fusion operation are performed on the multiple first feature maps to generate the second feature map. Specifically, the first feature map 4 is input into the feature pyramid network, and the first feature map 3 after dimensionality reduction is input into the feature pyramid network, which may fuse with the first feature map 4 to obtain a fused feature map 1; secondly, the first feature map 2 after dimensionality reduction is input into the feature pyramid network which may fuse with the fused feature map 1 to obtain a fused feature map 2; thirdly, the up-sampling operation may be performed on the fused feature map 2 to obtain the second feature map with the same size as the sample image; finally, a classifier may be used to activate the second feature map to obtain the second segmentation result of the background and the blood vessel in the epitaxial region.

However, the multiple of the up-sampling is also not limited in the embodiments of the present application. The training process shown in FIG. 6 is only an example of the cascaded neural network, which is not used to limit the present application.

In an embodiment, a loss function may be used to calculate a similarity loss between the second segmentation result and the second label (i.e., a target result of the background and the blood vessel), and a loss function value of the cascaded neural network may be obtained. The smaller the loss function value, the closer the predicted second segmentation result is to the target result, and the higher the accuracy of the correct prediction. In contrast, the larger the loss function value, the lower the accuracy of the correct prediction.

In an embodiment, a backward propagation of gradients may be performed on the loss function value of the cascaded neural network to update the parameters of the cascaded neural network, such as weights, bias values, etc., which is not limited in the present application.

In another embodiment of the present application, the method further includes: performing a max pooling operation on a region where the blood vessel in the second label is located to obtain a target region of the sample image after the region where the blood vessel in the second label is located is expanded. The obtaining a loss function value of the cascaded neural network according to the second segmentation result and the second label, includes: obtaining the loss function value of the cascaded neural network according to the second segmentation result corresponding to the target region and the second label.

In the existing segmentation network, the number of pixels of positive sample (i.e., the artery and the vein) is much smaller than the number of pixels of negative sample (i.e., the background), and this situation is called class imbalance in deep learning. The class imbalance may cause the model to be more inclined to learn the sample with a large size, i.e., the negative sample (i.e., the background).

Figure 7:
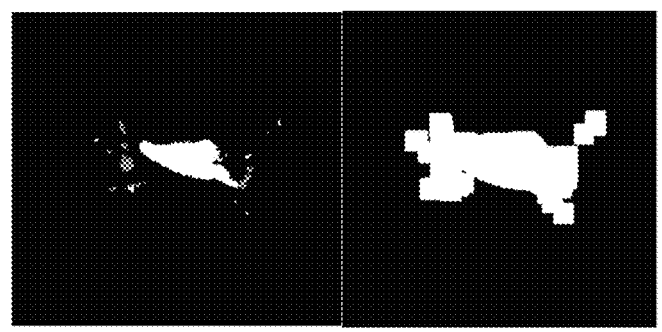
FIG. 7 is a schematic diagram of a marked sample image according to an embodiment of the present application.

In order to alleviate this problem, a mark region where the positive sample is located may be expanded by the max pooling operation. As shown in FIG. 7, the figure on the left is an original labeling result of the second label, in which the white-labeled region is the blood vessel, and the other black region is the background. The figure on the right is a marking result after expansion, in which the whole white region is a target region obtained by expanding the white-labeled region, including the white-labeled region on the left figure and the black region (i.e., the background) adjacent to the white-labeled region. Thus, the imbalance problem of the positive sample and the negative sample may be effectively reduced, so that the segmentation of the blood vessel is more detailed, and the convergence of the segmentation model may be accelerated.

In this embodiment, the max pooling operation may be performed on the region where the blood vessel in the second label is located (i.e., the white-labeled region) to obtain the target region of the sample image after the expansion of the region where the blood vessel in the second label is located (i.e., the target region after the expansion). The target region includes a blood vessel label and a background label adjacent to the blood vessel label.

The similarity loss between the second segmentation result corresponding to the target region and the second label of the sample image is calculated by using the loss function, to obtain the loss function value of the cascaded neural network. Thus, only the loss of the positive sample and the negative sample in the target region may be calculated, i.e., only the loss function of the pixel value in the target region may be calculated, which may effectively overcome the problem of the class imbalance.

Exemplary Device

The device embodiments of the present application may be used to perform the method embodiments of the present application. The details that are not disclosed in the device embodiments of the present application may refer to the method embodiments of the present application.

Figure 8:
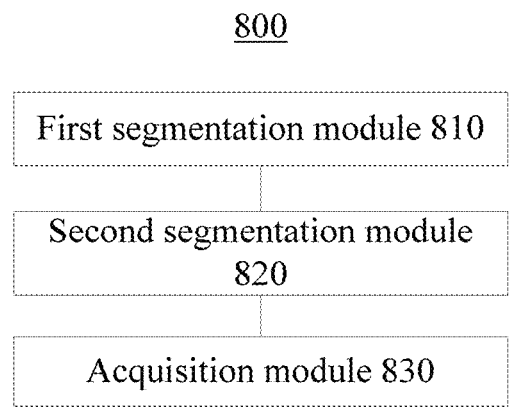
FIG. 8 is a block diagram of a device for image segmentation according to an embodiment of the present application.

FIG. 8 is a block diagram of a device for image segmentation according to an embodiment of the present application. As shown in FIG. 8, the device 800 may include: a first segmentation module 810, configured to acquire, according to an image to be segmented including a background, a mediastinum, an artery and a vein, a first segmentation result of the mediastinum, the artery, the vein and the background in a mediastinum region of the image to be segmented; a second segmentation module 820, configured to acquire, according to the image to be segmented, a second segmentation result of a blood vessel and the background in an epitaxial region of the image to be segmented; and an acquisition module 830, configured to acquire, according to the first segmentation result and the second segmentation result, a segmentation result of the mediastinum, the artery, the vein and the background of the image to be segmented.

Figure 9:
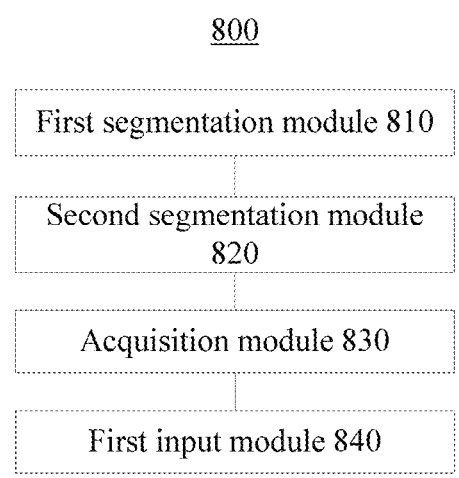
FIG. 9 is a block diagram of a device for image segmentation according to another embodiment of the present application.

In an embodiment, as shown in FIG. 9, the device 800 may further include a first input module 840, configured to input the image to be segmented into a network model.

In an embodiment, the first segmentation module 810 is further configured to acquire, according to the image to be segmented, the first segmentation result of the mediastinum, the artery, the vein and the background in the mediastinum region of the image to be segmented by the network model.

In an embodiment, the first input module 840 is further configured to, perform a dicing operation on the mediastinum region of the image to be segmented to obtain multiple dicing images, and each dicing image of the multiple dicing images including the mediastinum; and input the multiple dicing images into the network model.

In an embodiment, when the first segmentation module 810 is configured to acquire, according to the image to be segmented, the first segmentation result of the mediastinum, the artery, the vein and the background in the mediastinum region of the image to be segmented by the network model, the first segmentation module 810 is further configured to acquire, according to the multiple dicing images, multiple sub-segmentation results of the mediastinum, the artery, the vein and the background in the mediastinum region corresponding to the multiple dicing images by the network model; perform a combination operation on the multiple sub-segmentation results by a Gaussian smoothing process to obtain a combined segmentation result; and perform a post-processing on the combined segmentation result by a connected region algorithm to obtain the first segmentation result.

In an embodiment, when the first segmentation module 810 is configured to perform a post-processing on the combined segmentation result by a connected region algorithm to obtain the first segmentation result, the first segmentation module 810 is further configured to acquire a vein maximum connected region and an artery maximum connected region of the combined segmentation result by the connected region algorithm; and remove, according to the vein maximum connected region and the artery maximum connected region, a noise point in the combined segmentation result to obtain the first segmentation result, and the noise point including a point that is both on the artery and the vein and a false positive point.

Figure 10:
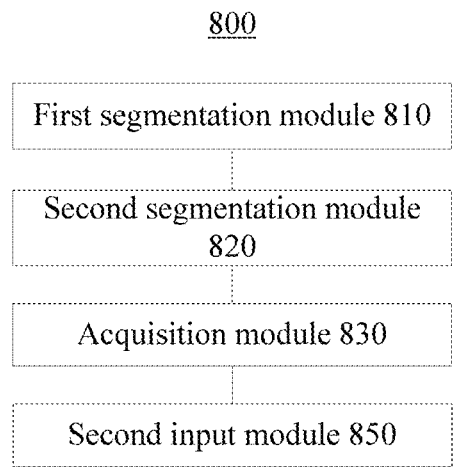
FIG. 10 is a block diagram of a device for image segmentation according to yet another embodiment of the present application.

In an embodiment, as shown in FIG. 10, the device 800 may further include a second input module 850, configured to input the image to be segmented into a segmentation model.

In an embodiment, the second segmentation module 820 is further configured to acquire, according to the image to be segmented, the second segmentation result of the blood vessel and the background in the epitaxial region by the segmentation model.

In an embodiment, the acquisition module 830 is further configured to acquire, according to the artery and the vein in the first segmentation result and the blood vessel in the second segmentation result, the segmentation result of the mediastinum, the artery, the vein and the background of the image to be segmented by a region growth algorithm.

In an embodiment, when the acquisition module 830 is configured to acquire the segmentation result of the mediastinum, the artery, the vein and the background of the image to be segmented by a region growth algorithm, the acquisition module 830 is further configured to perform, with the artery and the vein in the first segmentation result as a start point, a region growth on the artery and the vein in the first segmentation result along the blood vessel in the second segmentation result by a preset growth length, to obtain the segmentation result of the mediastinum, the artery, the vein and the background of the image to be segmented.

Figure 11:
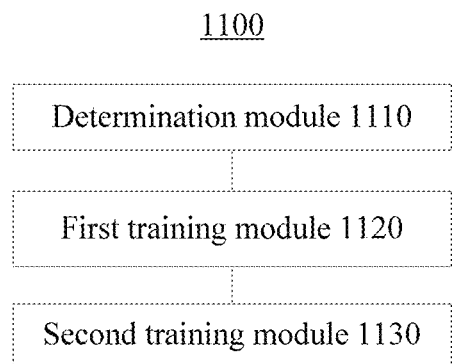
FIG. 11 is a block diagram of a device for training an image segmentation model according to an embodiment of the present application.

FIG. 11 is a block diagram of a device for training an image segmentation model according to an embodiment of the present application. As shown in FIG. 11, the device 1100 may include: a determination module 1110, configured to determine a sample image, and the sample image including a first label of a mediastinum, a background, an artery and a vein in a mediastinum region, and a second label of a background and a blood vessel in an epitaxial region; a first training module 1120, configured to train a neural network based on the sample image to generate a network model for obtaining a first segmentation result of the mediastinum, the background, the artery and the vein in the mediastinum region, and the neural network being a 3D neural network; and a second training module 1130, configured to train a cascaded neural network based on the sample image to generate a segmentation model for obtaining a second segmentation result of the background and the blood vessel in the epitaxial region, and the cascaded neural network including a first neural network for feature extraction and a second neural network for generating the second segmentation result.

Figure 12:
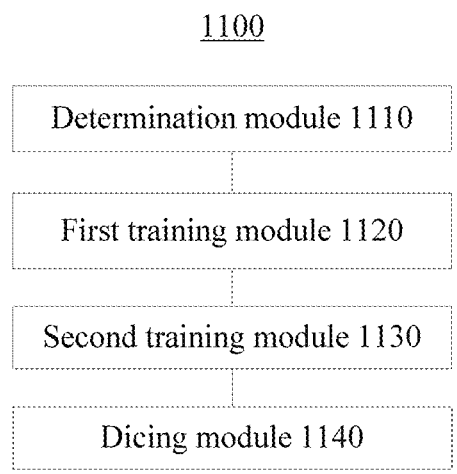
FIG. 12 is a block diagram of a device for training an image segmentation model according to another embodiment of the present application.

In an embodiment, as shown in FIG. 12, the device 1100 may further include a dicing module 1140, configured to perform a dicing operation on the mediastinum region of the sample image to obtain multiple dicing images, and each dicing image of the multiple dicing images includes the mediastinum.

In an embodiment, the first training module 1120 is further configured to train the neural network based on the multiple dicing images to generate the network model.

In an embodiment, the second training module 1130 is further configured to perform a down-sampling operation on the sample image by the first neural network to obtain multiple first feature maps; perform an up-sampling operation and a fusion operation on the multiple first feature maps by the second neural network to obtain a second feature map; activate the second feature map by using a classifier to obtain the second segmentation result of the background and the blood vessel in the epitaxial region; obtain a loss function value of the cascaded neural network according to the second segmentation result and the second label; and update parameters of the cascaded neural network according to the loss function value. The first neural network is a deep residual network, and the second neural network is a feature pyramid network.

Figure 13:
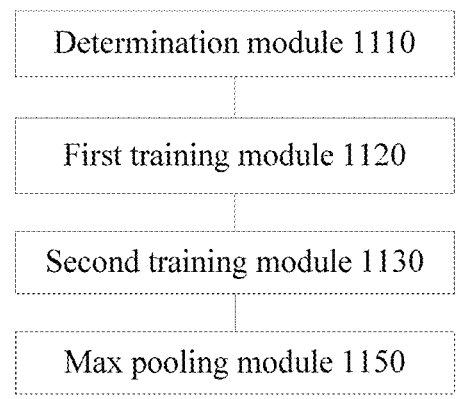
FIG. 13 is a block diagram of a device for training an image segmentation model according to yet another embodiment of the present application.

In an embodiment, as shown in FIG. 13, the device 1100 may further include a max pooling module 1150, configured to perform a max pooling operation on a region where the blood vessel in the second label is located to obtain a target region of the sample image after the region where the blood vessel in the second label is located is expanded.

In an embodiment, when the second training module 1130 is configured to acquire a loss function value of the cascaded neural network according to the second segmentation result and the second label, the second training module 1130 is further configured to obtain the loss function value of the cascaded neural network according to the second segmentation result corresponding to the target region and the second label.

Exemplary Electronic Apparatus

Figure 14:
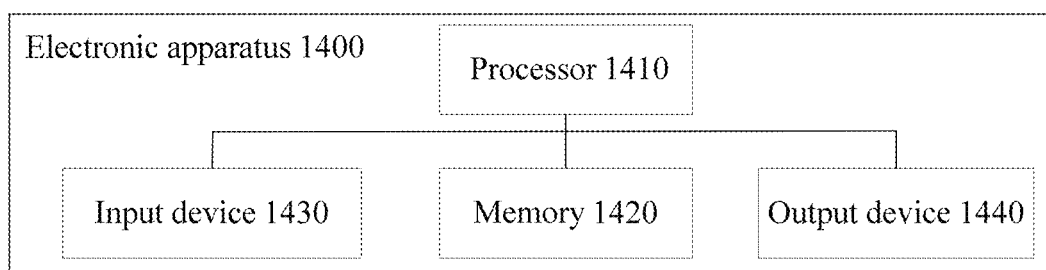
FIG. 14 is a structural block diagram of an electronic apparatus according to an embodiment of the present application.

An electronic apparatus according to embodiments of the present application may be described hereinafter with reference to FIG. 14. FIG. 14 is a structural block diagram of an electronic apparatus according to an embodiment of the present application.

As shown in FIG. 14, the electronic apparatus 1400 may include one or more processors 1410 and a memory 1420.

The processor 1410 may be a Central Processing Unit (CPU), or any other form of processing unit with data processing capability and/or instruction execution capability. And the processor 1410 may control other components in the electronic apparatus 1400 to perform desired functions.

The memory 1420 may include one or more computer program products, and the computer program products may include computer readable storage medium with various forms, such as a volatile memory and/or a non-volatile memory. The volatile memory may include, for example, a Random Access Memory (RAM) and/or a cache, etc. The non-volatile memory may include, for example, a Read-Only Memory (ROM), a hard disk, a flash memory, etc. One or more computer program instructions may be stored on the computer readable storage medium, and the processor 1410 may run the program instructions to implement the method for image segmentation and the method for training the image segmentation model above-mentioned in the various embodiments of the present application, and/or other desired functions.

In an example, the electronic apparatus 1400 may further include an input device 1430 and an output device 1440, and these components are interconnected by a bus system and/or a connection mechanism with other forms (not shown).

For example, the input device 1430 may be a microphone or a microphone array. When the electronic apparatus is a stand-alone apparatus, the input device 1430 may be a communication network connector.

Furthermore, the input device 1430 may further include, for example, a keyboard, a mouse, and so on.

The output device 1440 may output various kinds of information to the outside. The output device 1440 may include, for example, a display, a speaker, a printer, a communication network and a remote output device connected to it, and so on.

For simplicity, only some of the components of the electronic apparatus 1400 related to the present application are shown in FIG. 14, and other components, for example, buses, input/output interfaces, etc., are omitted. In addition, the electronic apparatus 1400 may also include any other appropriate components according to specific application conditions.

Exemplary Computer Program Product and Computer Readable Storage Medium

In addition to the above-mentioned methods and devices, the embodiments of the present application may also provide a computer program product. The computer program product may include computer program instructions, and when the computer program instructions are run by a processor, the processor is configured to perform the steps described in the "exemplary method" section above in this specification, in which the steps are used for performing the method for image segmentation and the method for training the image segmentation model according to the various embodiments of the present application.

The computer program product may be used to write program codes for performing the operations of the embodiments of the present application in any combination of one or more programming languages. The programming languages may include object-oriented programming languages, such as Java, C++, etc., and may also include conventional procedural programming languages, such as "C" language or similar programming languages. The program codes may be executed entirely on a user's computing device, or executed partly on a user's device, or executed as an independent software package, or executed partly on a user's computing device and partly on a remote computing device, or executed entirely on a remote computing device or a server.

Furthermore, the embodiments of the present application may also provide a computer readable storage medium, on which computer program instructions are stored. When the computer program instructions are run by a processor, the processor is configured to perform the steps described in the "exemplary method" section above in this specification, in which the steps are used for performing the method for image segmentation and the method for training the image segmentation model according to the various embodiments of the present application.

The computer readable storage medium may adopt any combination of one or more readable medium. The readable medium may be a readable signal medium or a readable storage medium. The readable storage medium may include, but is not limited to, for example, an electrical, magnetic, optical, electromagnetic, infrared, or semiconductor system, device, or component, or a combination of any of the above. More specific examples (non-exhaustive list) of the readable storage medium may include an electrical connection with one or more wires, a portable disk, a hard disk, a Random Access Memory (RAM), a Read-Only Memory (ROM), an Erasable type Programmable Read Only Memory (EPROM), a flash memory, an optical fiber, a portable Compact Disk Read Only Memory (CD-ROM), an optical storage device, a magnetic storage device, or any suitable combination of the above.

The above description has been given for the purposes of illustration and description. In addition, the description is not intended to limit the embodiments of the present application to the form disclosed herein. Although a number of examples and embodiments have been discussed above, those skilled in the art shall recognize certain variations, modifications, changes, additions, and sub-combinations thereof.

What is claimed is:

1. A method for image segmentation, comprising:
   acquiring an image to be segmented;
   segmenting a background, a mediastinum, an artery and a vein in a mediastinum region of the image to be segmented to obtain a first segmentation result of the mediastinum, the artery, the vein and the background in the mediastinum region of the image to be segmented;
   segmenting a blood vessel and the background in an epitaxial region of the image to be segmented to obtain a second segmentation result of the blood vessel and the background in the epitaxial region of the image to be segmented; and
   acquiring, according to the first segmentation result and the second segmentation result, a final segmentation result of the mediastinum, the artery, the vein and the background of the image to be segmented.

2. The method according to claim 1, further comprising:
   inputting the image to be segmented into a network model,
   wherein the segmenting a background, a mediastinum, an artery and a vein in a mediastinum region of the image to be segmented to obtain a first segmentation result of the mediastinum, the artery, the vein and the background in the mediastinum region of the image to be segmented, comprises:

segmenting the background, the mediastinum, the artery and the vein in the mediastinum region of the image to be segmented by the network model, to obtain the first segmentation result of the mediastinum, the artery, the vein and the background in the mediastinum region of the image to be segmented.

3. The method according to claim 2, wherein the inputting the image to be segmented into a network model, comprises:

performing a dicing operation on the mediastinum region of the image to be segmented to obtain multiple dicing images, and each dicing image of the multiple dicing images comprising the mediastinum; and inputting the multiple dicing images into the network model, wherein the segmenting the background, the mediastinum, the artery and the vein in the mediastinum region of the image to be segmented by the network model, to obtain the first segmentation result of the mediastinum, the artery, the vein and the background in the mediastinum region of the image to be segmented comprises:

segmenting the mediastinum, the artery, the vein and the background in the mediastinum region corresponding to the multiple dicing images by the network model, to obtain multiple sub-segmentation results of the mediastinum, the artery, the vein and the background in the mediastinum region corresponding to the multiple dicing images;

performing a combination operation on the multiple sub-segmentation results by a Gaussian smoothing process to obtain a combined segmentation result; and performing a post-processing on the combined segmentation result by a connected region algorithm to obtain the first segmentation result.

4. The method according to claim 3, wherein the performing a post-processing on the combined segmentation result by a connected region algorithm to obtain the first segmentation result, comprises:

acquiring a vein maximum connected region and an artery maximum connected region of the combined segmentation result by the connected region algorithm; and removing, according to the vein maximum connected region and the artery maximum connected region, a noise point in the combined segmentation result to obtain the first segmentation result, and the noise point comprises a point that is both on the artery and the vein and a false positive point.

5. The method according to claim 1, further comprising:

inputting the image to be segmented into a segmentation model, wherein the segmenting a blood vessel and the background in an epitaxial region of the image to be segmented; to obtain a second segmentation result of ache blood vessel and the background in the epitaxial region of the image to be segmented, comprises:

segmenting the blood vessel and the background in the epitaxial region of the image to be segmented by the segmentation model, to obtain the second segmentation result of the blood vessel and the background in the epitaxial region.

6. The method according to claim 1, wherein the acquiring, according to the first segmentation result and the second segmentation result, a final segmentation result of the mediastinum, the artery, the vein and the background of the image to be segmented, comprises:

acquiring, according to the artery and the vein in the first segmentation result and the blood vessel in the second segmentation result, the final segmentation result of the mediastinum, the artery, the vein and the background of the image to be segmented by a region growth algorithm.

7. The method according to claim 6, wherein the acquiring, according to the artery and the vein in the first segmentation result and the blood vessel in the second segmentation result, the final segmentation result of the mediastinum, the artery, the vein and the background of the image to be segmented by a region growth algorithm, comprises:

performing, with the artery and the vein in the first segmentation result as a start point, a region growth on the artery and the vein in the first segmentation result along the blood vessel in the second segmentation result by a preset growth length, to obtain the final segmentation result of the mediastinum, the artery, the vein and the background of the image to be segmented.

8. The method according to claim 1, further comprising:

determining a sample image, and the sample image comprising a first label of a mediastinum, a background, an artery and a vein in a mediastinum region and a second label of a background and a blood vessel in an epitaxial region;

training a neural network based on the sample image to generate a network model for obtaining a first segmentation result of the mediastinum, the background, the artery and the vein in the mediastinum region, and the neural network being a 3D neural network; and training a cascaded neural network based on the sample image to generate a segmentation model for obtaining a second segmentation result of the background and the blood vessel in the epitaxial region, and the cascaded neural network comprising a first neural network for feature extraction and a second neural network for generating the second segmentation result.

9. The method according to claim 8, further comprising:

performing a dicing operation on the mediastinum region of the sample image to obtain multiple dicing images, wherein each dicing image of the multiple dicing images comprises the mediastinum, and the training a neural network based on the sample image to generate a network model for obtaining a first segmentation result of the mediastinum, the background, the artery and the vein in the mediastinum region, comprises:

training the neural network based on the multiple dicing images to generate the network model.

10. The method according to claim 8, wherein the training a cascaded neural network based on the sample image to generate a segmentation model for obtaining a second segmentation result of the background and the blood vessel in the epitaxial region, comprises:

performing a down-sampling operation on the sample image by the first neural network to obtain multiple first feature maps;

performing an up-sampling operation and a fusion operation on the multiple first feature maps by the second neural network to obtain a second feature map;

activating the second feature map by using a classifier to obtain the second segmentation result of the background and the blood vessel in the epitaxial region;

obtaining a loss function value of the cascaded neural network according to the second segmentation result and the second label; and updating parameters of the cascaded neural network according to the loss function value, the first neural network is a deep residual network, and the second neural network is a feature pyramid network.

11. The method according to claim 10, further comprising:

performing a max pooling operation on a region where the blood vessel in the second label is located to obtain a target region of the sample image after the region where the blood vessel in the second label is located is expanded, wherein the obtaining a loss function value of the cascaded neural network according to the second segmentation result and the second label, comprises:

obtaining the loss function value of the cascaded neural network according to the second segmentation result corresponding to the target region and the second label.

12. An electronic apparatus, comprising:

a processor;

a memory configured to store executable instructions of the processor;

wherein the processor is configured to perform the following steps:

acquiring an image to be segmented;

segmenting a background, a mediastinum, an artery and a vein in a mediastinum region of the image to be segmented to obtain a first segmentation result of the mediastinum, the artery, the vein and the background in the mediastinum region of the image to be segmented;

segmenting a blood vessel and the background in an epitaxial region of the image to be segmented; to obtain a second segmentation result of the blood vessel and the background in the epitaxial region of the image to be segmented; and acquiring, according to the first segmentation result and the second segmentation result, a final segmentation result of the mediastinum, the artery, the vein and the background of the image to be segmented.

13. The electronic apparatus according to claim 12, wherein the processor further performs the following step:

inputting the image to be segmented into a network model, wherein the segmenting a background, a mediastinum, an artery and a vein in a mediastinum region of the image to be segmented to obtain a first segmentation result of the mediastinum, the artery, the vein and the background in the mediastinum region of the image to be segmented, comprises:

segmenting the background, the mediastinum, the artery and the vein in the mediastinum region of the image to be segmented by the network model, to obtain the first segmentation result of the mediastinum, the artery, the vein and the background in the mediastinum region of the image to be segmented.

14. The electronic apparatus according to claim 13, wherein the inputting the image to be segmented into a network model, comprises:

performing a dicing operation on the mediastinum region of the image to be segmented to obtain multiple dicing images, and each dicing image of the multiple dicing images comprising the mediastinum; and inputting the multiple dicing images into the network model, wherein the segmenting the background, the mediastinum, the artery and the vein in the mediastinum region of the image to be segmented by the network model, to obtain the first segmentation result of the mediastinum, the artery, the vein and the background in the mediastinum region of the image to be segmented comprises:

segmenting the mediastinum, the artery, the vein and the background in the mediastinum region corresponding to the multiple dicing images by the network model, to obtain multiple sub-segmentation results of the mediastinum, the artery, the vein and the background in the mediastinum region corresponding to the multiple dicing images;

performing a combination operation on the multiple sub-segmentation results by a Gaussian smoothing process to obtain a combined segmentation result; and performing a post-processing on the combined segmentation result by a connected region algorithm to obtain the first segmentation result.

15. The electronic apparatus according to claim 12, wherein the processor further performs the following step:

inputting the image to be segmented into a segmentation model, wherein the segmenting a blood vessel and the background in an epitaxial region of the image to be segmented; to obtain a second segmentation result of the blood vessel and the background in the epitaxial region of the image to be segmented, comprises:

segmenting a blood vessel and the background in an epitaxial region of the image to be segmented by the segmentation model, to obtain the second segmentation result of the blood vessel and the background in the epitaxial region.

16. The electronic apparatus according to claim 12, wherein the acquiring, according to the first segmentation result and the second segmentation result, a final segmentation result of the mediastinum, the artery, the vein and the background of the image to be segmented, comprises:

acquiring, according to the artery and the vein in the first segmentation result and the blood vessel in the second segmentation result, the final segmentation result of the mediastinum, the artery, the vein and the background of the image to be segmented by a region growth algorithm.

17. The electronic apparatus according to claim 12, wherein the processor further performs the following steps:

determining a sample image, and the sample image comprising a first label of a mediastinum, a background, an artery and a vein in a mediastinum region and a second label of a background and a blood vessel in an epitaxial region;

training a neural network based on the sample image to generate a network model for obtaining a first segmentation result of the mediastinum, the background, the artery and the vein in the mediastinum region, and the neural network being a 3D neural network; and training a cascaded neural network based on the sample image to generate a segmentation model for obtaining a second segmentation result of the background and the blood vessel in the epitaxial region, and the cascaded neural network comprising a first neural network for feature extraction and a second neural network for generating the second segmentation result.

18. The electronic apparatus according to claim 17, wherein the processor further performs the following step:

performing a dicing operation on the mediastinum region of the sample image to obtain multiple dicing images, wherein each dicing image of the multiple dicing images comprises the mediastinum, wherein the training a neural network based on the sample image to generate a network model for obtaining a first segmentation result of the mediastinum, the background, the artery and the vein in the mediastinum region, comprises:

training the neural network based on the multiple dicing images to generate the network model.

19. The electronic apparatus according to claim 17, wherein the training a cascaded neural network based on the sample image to generate a segmentation model for obtaining a second segmentation result of the background and the blood vessel in the epitaxial region, comprises:

performing a down-sampling operation on the sample image by the first neural network to obtain multiple first feature maps;

performing an up-sampling operation and a fusion operation on the multiple first feature maps by the second neural network to obtain a second feature map;

activating the second feature map by using a classifier to obtain the second segmentation result of the background and the blood vessel in the epitaxial region;

obtaining a loss function value of the cascaded neural network according to the second segmentation result and the second label; and updating parameters of the cascaded neural network according to the loss function value, wherein the first neural network is a deep residual network, and the second neural network is a feature pyramid network.

20. A non-transitory computer readable storage medium having stored thereon executable instructions configured to cause a processor to perform the following steps:

acquiring an image to be segmented;

segmenting a background, a mediastinum, an artery and a vein in a mediastinum region of the image to be segmented to obtain a first segmentation result of the mediastinum, the artery, the vein and the background in the mediastinum region of the image to be segmented;

segmenting a blood vessel and the background in an epitaxial region of the image to be segmented; to obtain a second segmentation result of the blood vessel and the background in the epitaxial region of the image to be segmented; and acquiring, according to the first segmentation result and the second segmentation result, a final segmentation result of the mediastinum, the artery, the vein and the background of the image to be segmented.

* * * * *